United States Patent
Jeong et al.

[19]

[11] Patent Number: 5,887,103
[45] Date of Patent: Mar. 23, 1999

[54] NONLINEAR GRATING COUPLER USING A TAPERED OR STEPPED NONLINEAR THIN FILM

[75] Inventors: Jong-Sool Jeong; Seok-Ho Song, both of Daejeon, Rep. of Korea

[73] Assignee: Electronics and Telecommunications Research Institute, Daejeon, Rep. of Korea

[21] Appl. No.: 932,221

[22] Filed: Sep. 17, 1997

[30] Foreign Application Priority Data

Dec. 23, 1996 [KR] Rep. of Korea .................. 9670173

[51] Int. Cl.[6] ...................................... G02B 6/34
[52] U.S. Cl. .......................... 385/122; 385/37; 385/43
[58] Field of Search ................... 385/37, 43, 129, 385/130, 131, 122

[56] References Cited

U.S. PATENT DOCUMENTS 4,852,961  8/1989  Yamamoto et al. ............... 385/122
5,101,459  3/1992  Sunagawa ........................ 385/37
5,208,882  5/1993  Strasser et al. .................. 385/37
5,619,369  4/1997  Yamamoto et al. ............... 385/37
5,784,507  7/1998  Holm-Kennedy et al. ......... 385/31

FOREIGN PATENT DOCUMENTS 0379358  7/1990  European Pat. Off. ............ 385/37

Primary Examiner—John D. Lee
Assistant Examiner—Juliana K. Kang
Attorney, Agent, or Firm—Cohen, Pontani, Lieberman, Pavane

[57] ABSTRACT

A structure for a nonlinear grating coupler which is capable of providing a structure that a tapered nonlinear thin film and a linear waveguide grating structure are combined and a nonlinear grating coupler that a stepped nonlinear thin film and a linear optical waveguide grating structure are combined. The structure includes a tapered nonlinear thin film having a third-order nonlinearity, a linear optical waveguide having a refractive index greater than a linear refractive index of a nonlinear thin film formed on the tapered nonlinear thin film, and a grating structure formed on the linear optical waveguide.

2 Claims, 4 Drawing Sheets

NONLINEAR GRATING COUPLER USING A TAPERED OR STEPPED NONLINEAR THIN FILM

BACKGROUND OF THE INVENTION

1. Field of the Invention

The present invention relates to a structure for a nonlinear grating coupler, and particularly, to an improved structure for a nonlinear grating coupler which make it possible to provide a tapered nonlinear thin film and a stepped nonlinear thin film which are adaptable to an active optical connection implemented from a two-dimensional space to a third-order space.

2. Description of the Conventional Art

Various optical waveguide grating structures were introduced in the industry. The grating structure is generally formed on a linear and nonlinear optical waveguide. Here, the linear grating structure is widely used for a grating coupler, an optical interconnection, etc., and the nonlinear grating structure is widely used for a power-dependent grating coupler and an all-optical beam scanner. The grating-assisted directional coupler (GADC) of the linear and non-linear grating structures has an advantages in that it can be used for a wavelength selective coupler for implementing the WDM.

SUMMARY OF THE INVENTION

Accordingly, it is an object of the present invention to provide a structure for a nonlinear grating coupler which overcomes the aforementioned problems encountered in the conventional art.

It is another object of the present invention to provide an improved structure for a nonlinear grating coupler which is applicable to an all-optical grating coupler for implementing a high speed all-optical signal processing network.

It is another object of the present invention to provide an improved structure for a nonlinear grating coupler which is capable of providing a structure that a tapered nonlinear thin film and a linear waveguide grating structure are combined and a nonlinear grating coupler that a stepped nonlinear thin film and a linear optical waveguide grating structure are combined.

To achieve the above objects, there is provided an improved structure for a nonlinear grating coupler which includes a tapered nonlinear thin film having a third-order nonlinearity, a linear optical waveguide having a refractive index greater than a linear refractive index of a nonlinear thin film formed on the tapered nonlinear thin film, and a grating structure formed on the linear optical waveguide.

To achieve the above objects, there is provided an improved structure for a nonlinear grating coupler which includes a stepped nonlinear thin film a third-order nonlinearity, a linear optical waveguide having a refractive index greater than a linear refractive index of a nonlinear thin film formed on the stepped nonlinear thin film, and a grating structure formed on the linear optical waveguide.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The structure of a nonlinear grating coupler according to the present invention is classified as follows.

Namely, there are a structure that a tapered nonlinear thin film and a linear waveguide grating structure are combined and another structure that a stepped nonlinear thin film and a linear optical waveguide grating structure are combined. The above-described nonlinear optical waveguide grating structure is directed to selecting a position of an out-coupling beam by adjusting the power of an optical waveguide and selecting the position of an out-coupling beam (light) from a wide range, so that the nonlinear optical waveguide grating structure is applicable to an all-optical beam scanner and to an active optical interconnection.

The structure for a nonlinear grating coupler according to the present invention will now be explained in more detail with reference to FIG. 1.

Figure 1:
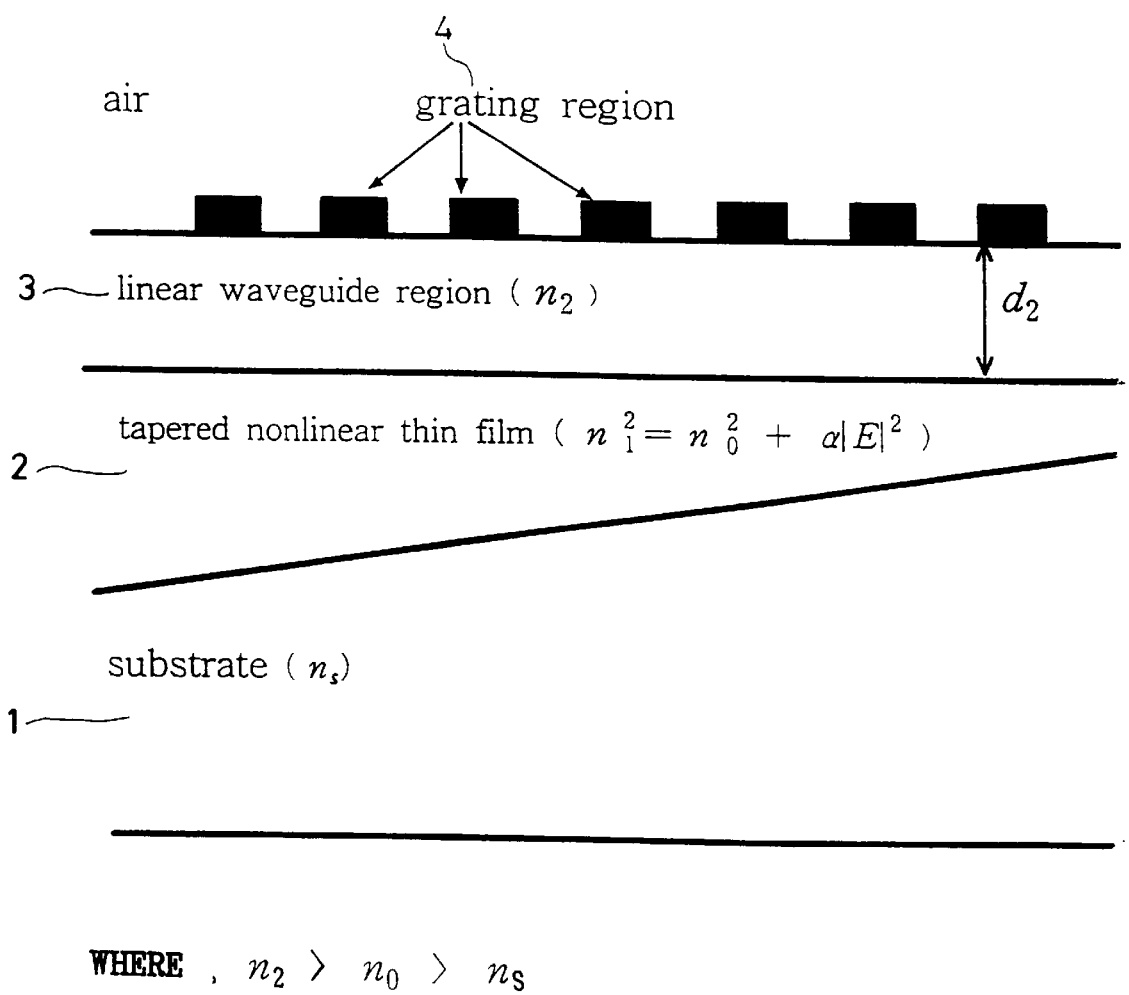
FIG. 1 is a view illustrating a nonlinear grating coupler having a tapered nonlinear thin film according to the present invention.

FIG. 1 illustrates a nonlinear grating coupler having a tapered nonlinear thin film according to the present invention.

First, a tapered nonlinear thin film 2 having a third-order nonlinearity is formed on a substrate 1. Refractive index $n_1$ of the nonlinear thin film is $n_1^2 = n_0^2 + \alpha|E|^2$ and varies with respect to the power variation of an advancing light. Here, a denotes a nonlinear coefficient. In addition, a linear optical waveguide having a refractive index of $n_2$ which is greater than a linear refractive index of $n_0$ of the nonlinear thin film is formed on the nonlinear thin film, and a grating structure 4 is formed on the linear optical waveguide 3. The liner index $n_0$ of nonliner thin film is greater than the refractive index of $n_0$ of the substrate.

Figure 2:
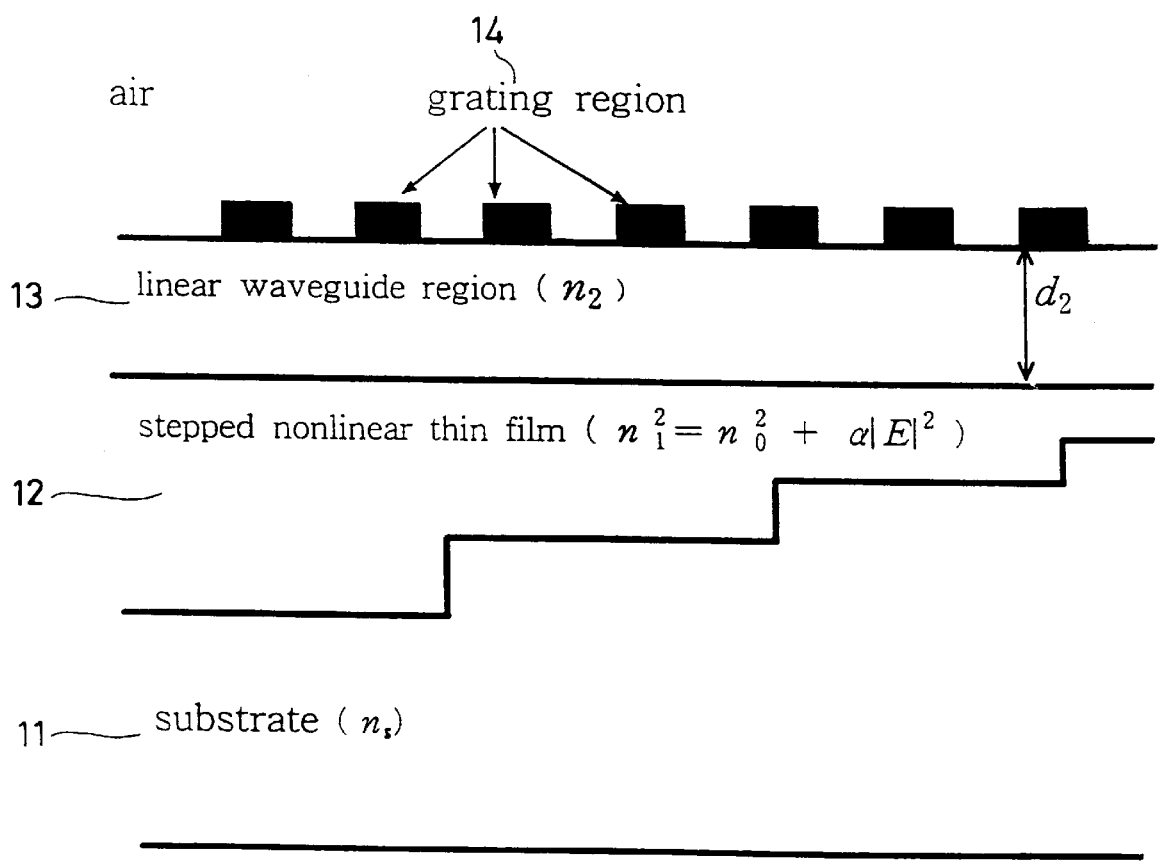
FIG. 2 is a view illustrating a nonlinear grating coupler having a stepped nonlinear thin film according to the present invention.

FIG. 2 illustrates a nonlinear grating coupler having a stepped nonlinear thin film according to the present invention.

As shown therein, a stepped nonlinear thin film 12 having a third-order nonlinearity is formed on a substrate 11.

The refractive index $n_1$ of the nonlinear thin film is $n_1^2 = n_0^2 + \alpha|E|^2$ and varies with respect to the power variation of an advancing light. Here, $\alpha$ denotes a nonlinear coefficient. In addition, a linear optical waveguide having a refractive index of $n_2$ greater than a linear refractive index $n_2$ of the linear thin film is formed on the stepped nonlinear thin film 12, and a grating structure 14 is formed on the linear optical waveguide 13.

Figure 3:
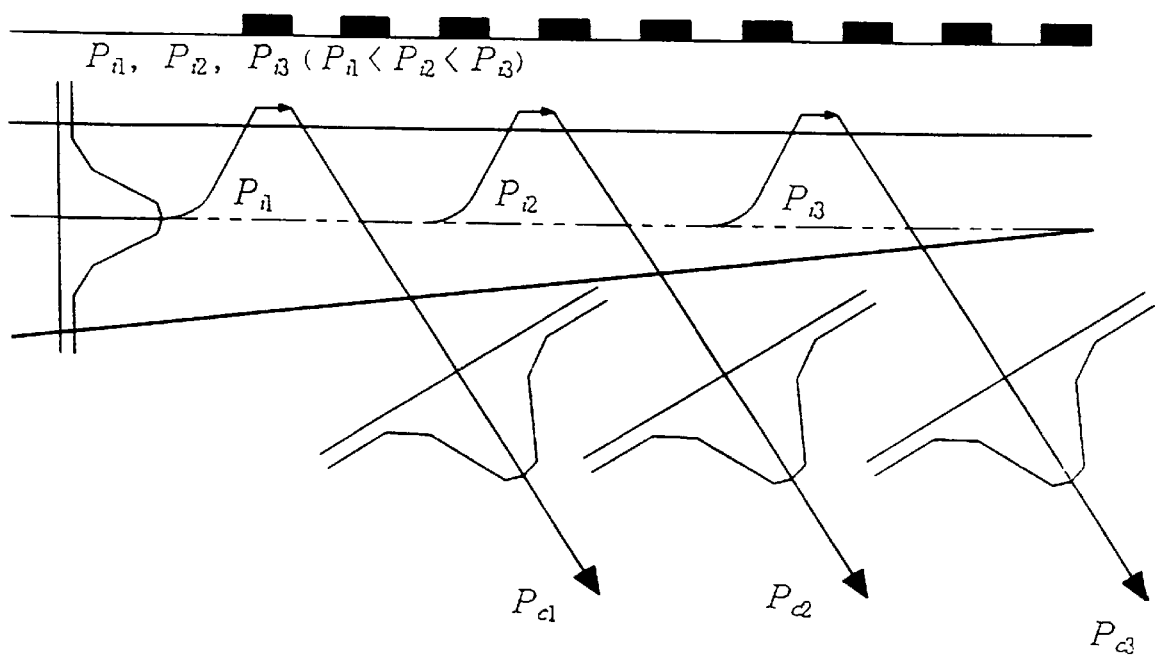
FIG. 3 is a view illustrating the position of an out-coupling beam based on a power adjustment of an optical waveguide.

FIG. 3 illustrates the position of an out-coupling beam based on a power adjustment of an optical waveguide.

Figure 4:
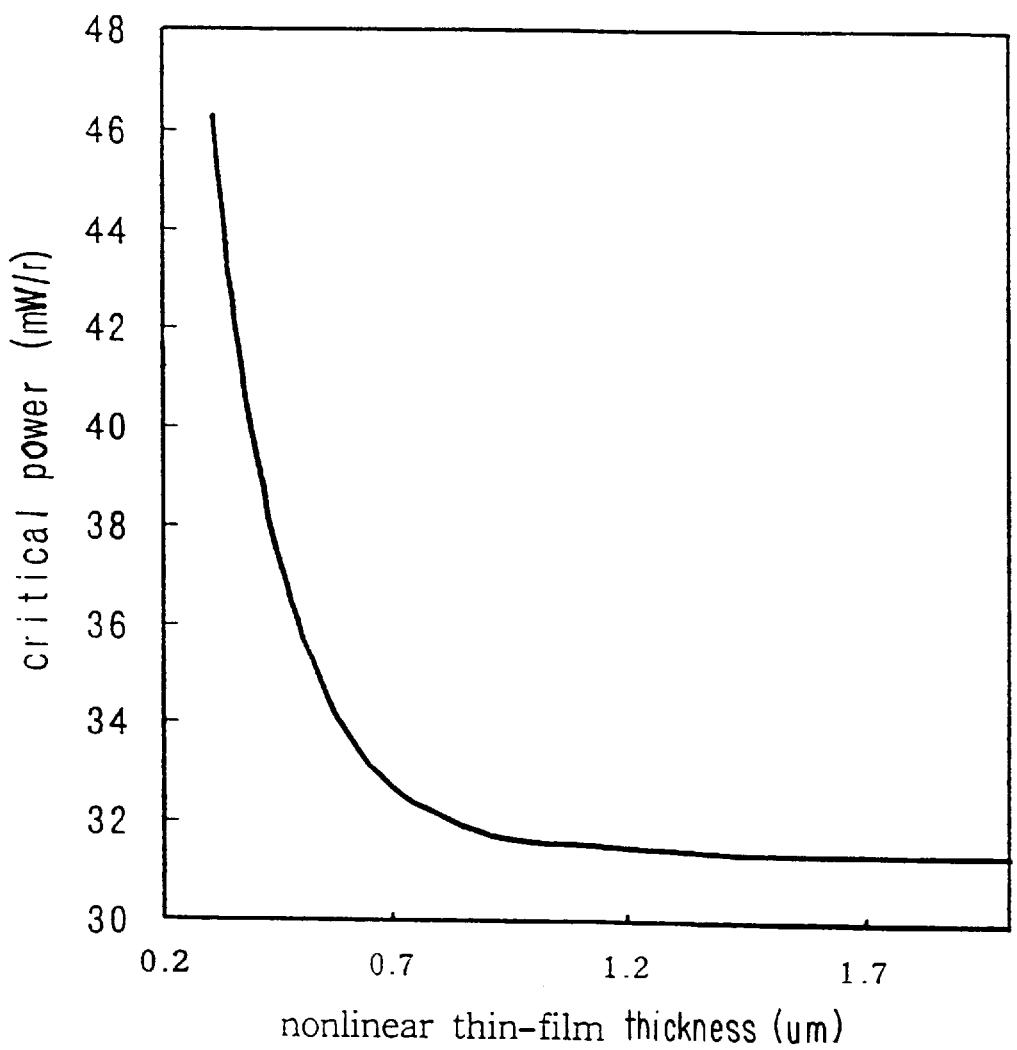
FIG. 4 is a graph illustrating a characteristic variation of a critical power with respect to a thickness variation of a nonlinear thin film.

As shown therein, on the assumption that the powers of incident light launching into the nonlinear optical waveguide are $P_{i1}$, $P_{i2}$, and $P_{i3}$ ($P_{i1}<P_{i2}<P_{i3}$), the powers of the out-coupling beam matching with each input power are indicated as $P_{c1}$, $P_{c2}$, and $P_{c3}$. In the nonlinear optical waveguide grating structure according to the present invention, it is possible to actively select the position of the out-coupling beam (light) by adjusting the power of the incident light. The detailed principle thereof will now be explained as follows. When the incident light having a power smaller than the critical power $P_{critical}$ is made incident into the nonlinear optical waveguide region of the nonlinear optical waveguide grating structure, the refractive index $n_1$ of the nonlinear optical waveguide is smaller than the refractive index $n_2$ of the linear optical waveguide, the incident light is confined into the interior of the linear optical waveguide. The wave confined in the interior of the linear optical waveguide is diffracted by the grating structure and propagates. However, if the power of the incident light is larger than the critical power, the refractive index of the nonlinear waveguide is made greater than the refractive index of the linear optical waveguide due to the nonlinearity of the nonlinear optical waveguide, and the power of the incident light is trapped to the nonlinear thin film region. Here, it is known that the critical power $P_{critical}$ with respect to the thickness variation of the nonlinear thin film, as shown in FIG. 4, are greatly influenced. When the thickness of the nonlinear thin film is made thinner, since the critical power is increased, in the case of the tapered nonlinear thin film, the incident light having a higher power, propagates further in the interior of the nonlinear optical waveguide than the incident light having a lower power.

Therefore, the propagation distance of the light which is made incident into the interior of the nonlinear optical waveguide is greatly influenced by the power of the incident light. The optical waveguide transferred into the linear optical waveguide region is externally diffracted by the grating structure. As a result, it is possible to actively select the position of the out-coupling beam (light) externally diffracted by only the variation of the power of the incident light without adjusting the driving voltage.

As described above, the structure for a nonlinear grating coupler according to the present invention has the following advantages.

First, it is possible to select the position of the out-coupling beam by adjusting the power of a waveguide.

Second, it is possible to select the position of the out-coupling beam for a wide region.

Third, the structure for a nonlinear grating coupler is applicable to an active optical connection.

Fourth, the structure for a nonlinear grating coupler is applicable to an all optical scanner of a very wide region.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A structure for a nonlinear grating coupler for use in the location control of an out-coupling beam, comprising:

a tapered nonlinear thin film formed on a substrate and having a third-order nonlinearity;

a linear optical waveguide formed on the tapered nonlinear thin film, said linear optical waveguide having a refractive index greater than a linear refractive index of the tapered nonlinear thin film; and a grating structure formed on the linear optical waveguide.

2. A structure for a nonlinear grating coupler for use in the location control of an out-coupling beam, comprising:

a stepped nonlinear thin film formed on a substrate and having a third-order nonlinearity;

a linear optical waveguide formed on the stepped nonlinear thin film, said linear optical waveguide having a refractive index greater than a linear refractive index of the stepped nonlinear thin film; and a grating structure formed on the linear optical waveguide.

* * * * *